(12) United States Patent
Onimaru et al.

(10) Patent No.: US 7,821,177 B2
(45) Date of Patent: Oct. 26, 2010

(54) LAMINATED CORE

(75) Inventors: Sadahisa Onimaru, Chiryu (JP); Hirofumi Kinjou, Obu (JP); Daisuke Miyata, Okazaki (JP); Katsuhiko Oka, Kariya (JP)

(73) Assignee: Nippon Soken, Inc., Nishio (JP)

( * ) Notice: Subject to any disclaimer, the term of this patent is extended or adjusted under 35 U.S.C. 154(b) by 330 days.

(21) Appl. No.: 12/071,588

(22) Filed: Feb. 22, 2008

(65) Prior Publication Data

US 2008/0231138 A1 Sep. 25, 2008

(30) Foreign Application Priority Data

Mar. 20, 2007 (JP) ............................. 2007-073322

(51) Int. Cl.
*H02K 1/06* (2006.01)
(52) U.S. Cl. ...................... 310/216.129; 310/49.21; 310/49.29; 310/112; 310/156.35; 310/216.007; 310/216.008; 310/216.009; 310/216.058; 310/216.085; 310/216.131; 310/216.136
(58) Field of Classification Search .......... 310/216.129, 310/216.131, 216.136, 49.21, 29.2, 112, 310/156.35, 216.007, 216.008, 216.009, 310/216.058, 216.085, 216.015; *H02K 1/06*
See application file for complete search history.

(56) References Cited

U.S. PATENT DOCUMENTS

| | | | |
|---|---|---|---|
| 2,393,065 A * | 1/1946 | Rose ........................ | 310/411 |
| 2,556,013 A * | 6/1951 | Thomas ................ | 310/216.032 |
| 2,846,603 A * | 8/1958 | Webster et al. ............... | 310/433 |
| 2,953,697 A * | 9/1960 | Wall ............................. | 310/51 |
| 3,829,720 A * | 8/1974 | Swanke et al. ................ | 310/43 |
| 3,940,648 A * | 2/1976 | Wielt et al. ........... | 310/216.131 |
| 4,007,867 A * | 2/1977 | Wielt et al. ............... | 228/179.1 |
| 4,012,653 A * | 3/1977 | Shigeta et al. .............. | 310/432 |
| 4,485,320 A * | 11/1984 | Kawada et al. ........ | 310/216.129 |

(Continued)

FOREIGN PATENT DOCUMENTS

JP 63-277438 11/1988

(Continued)

OTHER PUBLICATIONS

Japanese Office Action dated Feb. 10, 2009, issued in corresponding Japanese Application No. 2007-073322, with English translation.

(Continued)

*Primary Examiner*—Quyen Leung
*Assistant Examiner*—John K Kim
(74) *Attorney, Agent, or Firm*—Nixon & Vanderhye, PC

(57) ABSTRACT

A laminated core includes a laminated body, clamping plates and holding members. The laminated body includes a plurality of amorphous alloy plates, which are stacked one after another in a stacking direction such that each adjacent two of the plurality of amorphous alloy plates directly contact with each other. The clamping plates contact opposed end surfaces, respectively, of the laminated body in the stacking direction. A thickness of each of the first and second clamping plates in the stacking direction is larger than that of each of the plurality of amorphous alloy plates. Each holding member contacts with the clamping plates and maintains a predetermined space between the clamping plates while the laminated body is clamped between the clamping plates.

11 Claims, 3 Drawing Sheets

U.S. PATENT DOCUMENTS

| | | | | |
|---|---|---|---|---|
| 4,745,314 A | * | 5/1988 | Nakano | 310/57 |
| 5,233,248 A | * | 8/1993 | Kawamura et al. | 310/88 |
| 5,767,602 A | * | 6/1998 | Sargeant | 310/432 |
| 6,072,259 A | * | 6/2000 | Kawabata et al. | 310/216.115 |
| 6,144,129 A | * | 11/2000 | Fuller et al. | 310/91 |
| 6,166,469 A | * | 12/2000 | Osama et al. | 310/90.5 |
| 6,566,781 B2 | * | 5/2003 | Oohashi et al. | 310/216.008 |
| 6,737,784 B2 | * | 5/2004 | Lindquist et al. | 310/216.004 |
| 7,019,430 B2 | * | 3/2006 | Ioi et al. | 310/216.043 |
| 7,260,880 B2 | * | 8/2007 | Harada et al. | 29/596 |
| 7,268,450 B2 | * | 9/2007 | Takeuchi | 310/52 |
| 7,714,477 B2 | * | 5/2010 | Nagashima et al. | 310/216.129 |
| 2002/0158540 A1 | * | 10/2002 | Lindquist et al. | 310/216 |
| 2002/0171314 A1 | * | 11/2002 | Salem et al. | 310/254 |
| 2008/0231138 A1 | * | 9/2008 | Onimaru et al. | 310/217 |

FOREIGN PATENT DOCUMENTS

| | | |
|---|---|---|
| JP | 02-303336 | 12/1990 |
| JP | 5-109545 | 4/1993 |
| JP | 06-141515 | 5/1994 |
| JP | 6-292326 | 10/1994 |
| JP | 11-191942 | 7/1999 |
| JP | 2001-025185 | 1/2001 |
| JP | 2002-507878 | 3/2002 |
| JP | 2003-303727 | 10/2003 |
| WO | 99/48187 | 9/1999 |

OTHER PUBLICATIONS

Japanese Office Action dated May 12, 2009, issued in corresponding Japanese Application No. 2007-073322, with English translation.
Japanese Office Action dated Oct. 20, 2009, issued in corresponding Japanese Application No. 2007-073322, with English translation.

* cited by examiner

LAMINATED CORE

CROSS REFERENCE TO RELATED APPLICATION

This application is based on and incorporates herein by reference Japanese Patent Application No. 2007-73322 filed on Mar. 20, 2007.

BACKGROUND OF THE INVENTION

1. Field of the Invention

The present invention relates to a laminated core for an electromagnetic device.

2. Description of Related Art

Previously, various laminated cores, which use amorphous alloy instead of magnetic steel, have been proposed to reduce an iron loss (particularly, an eddy current loss) in an electromagnetic device, such as an electric motor, a transformer.

For example, Japanese Unexamined Patent Publication No. H06-292326 discloses one such core (laminated core). In this core, amorphous alloy plates are stacked one after another in a stacking direction to form a laminated body. This laminated body is clamped between two support plates in a direction perpendicular to the stacking direction.

Furthermore, in an article "Performance of Motor Using Amorphous Alloy Laminated Core" recited at pages B2-2-1 to B2-2-10 of a published textbook of 13th Applied Magnetic Technology Symposium dated Apr. 20, 2005, Chiba et al. teaches a technique where amorphous alloy plates (amorphous alloy thin films), each of which is coated with heat-resistant resin adhesive on one side thereof, are stacked together to form a laminated core. That is, the resin layer is interposed between each adjacent two amorphous alloy thin films in the laminated core.

In the laminated core of Japanese Unexamined Patent Publication No. H06-292326, the laminated body is clamped between the two support plates in the direction perpendicular to the stacking direction of the laminated body. Furthermore, in the clamped state where the amorphous alloy plates are clamped between the two support plates, windings are wound around the laminated core to hold the amorphous plates and the two support plates together. Thus, the amorphous alloy plates are not securely fixed together in the stacking direction, and thereby, such a core may not be suitable in a device, such as an electric motor, in which a mechanical torque is applied to the core.

Furthermore, in the above technology disclosed by Chiba et al. in the article "Performance of Motor Using Amorphous Alloy Laminated Core", a space factor (a ratio of a total volume of the amorphous alloy plates in the entire volume of the laminated core) is reduced due to the presence of the resin layers in the laminated core, so that it may have adverse influences on the function of the laminated core.

Furthermore, the inventors of the present application have tried to weld amorphous alloy plates from a lateral side of the core. However, a crack is disadvantageously generated around the welded parts of the amorphous alloy plates.

SUMMARY OF THE INVENTION

The present invention addresses the above disadvantages. According to one aspect of the present invention, there is provided a laminated core for an electromagnetic device, such as an electric motor. The laminated core includes a laminated body, first and second clamping plates and at least one holding member. The laminated body includes a plurality of amorphous alloy plates, which are stacked one after another in a stacking direction such that each adjacent two of the plurality of amorphous alloy plates directly contact with each other. The first and second clamping plates contact opposed first and second end surfaces, respectively, of the laminated body in the stacking direction. A thickness of each of the first and second clamping plates in the stacking direction is larger than that of each of the plurality of amorphous alloy plates. The at least one holding member contacts with the first and second clamping plates and maintains a predetermined space between the first and second clamping plates while the laminated body is clamped between the first and second clamping plates.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

First Embodiment

A first embodiment of the present invention will be described with reference to FIGS. 1 to 5. In this embodiment, a laminated core of the present invention is employed as a stator core that constitutes a stator of a three-phase induction electric motor (hereinafter referred to as the motor).

Figure 1:
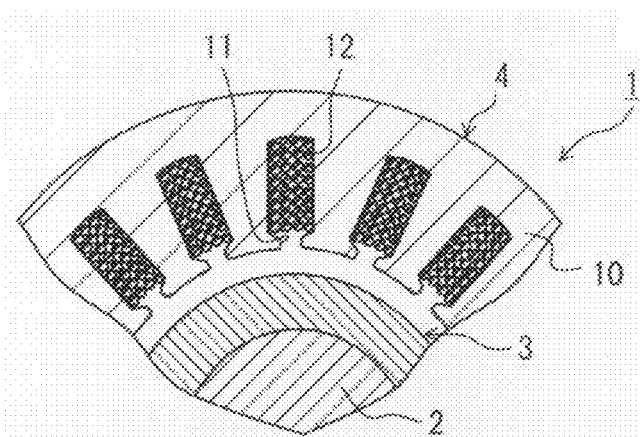
FIG. 1 is a partial cross sectional view illustrating a general configuration around a stator of an electric motor, which includes a stator core according to a first embodiment of the present invention.

As shown in FIG. 1, the motor 1 includes a rotatable shaft 2, a rotor 3 and a stator 4. The rotor 3 is fixed around the rotatable shaft 2, and the stator 4 is placed radially outward of the rotor 3 in such a manner that a predetermined gap is formed between the rotor 3 and the stator 4. The rotor 3 is rotated about a rotational axis of the rotatable shaft 2 in response to a magnetic field generated from the stator 4. The rotor 3 may include a magnet(s) depending on a type of the motor 1.

The stator 4 includes a stator core 10 and windings 12. The stator core 10 serves as a laminated core of the present invention. The windings 12 are wound around the stator core 10 to provide three phases (U phase, V phase and W phase). More specifically, the stator core 10 includes a plurality of slots 11, which are placed one after another along an inner peripheral part of the stator core 10, and the windings 12 are received in the corresponding slots 11. The stator core 10 includes at least one core block. In the present embodiment, as shown in FIG. 2, four core blocks 20 are stacked one after another to form the stator core 10.

Figure 2:
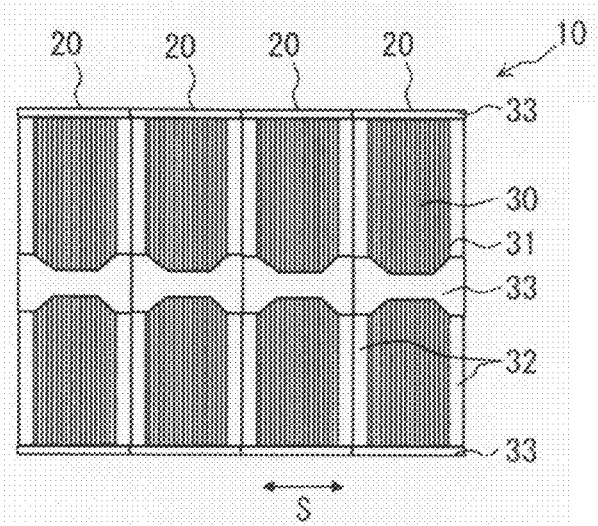
FIG. 2 is a lateral side view of the stator core of the first embodiment.
Figure 3:
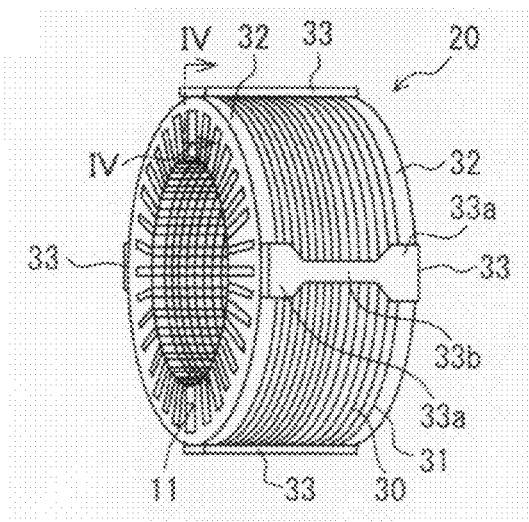
FIG. 3 is a perspective view illustrating one of core blocks of the stator core.

As shown in FIGS. 2 and 3, each core block 20 includes a laminated body 31, two clamping plates 32 and holding members 33. The laminated body 31 is formed by stacking amorphous alloy plates 30 one after another in a stacking direction S (see FIG. 2) such that each adjacent two amorphous alloy plates 30 directly contact with each other. The clamping plates 32 contact two opposed end surfaces, respectively, of the laminated body 31, which are opposed to each other in the stacking direction S. The holding members 33 maintain a predetermined space between the clamping plates 2 in such a manner that the laminated body 31 is clamped between the clamping plates 2 to make a close contact between each adjacent two amorphous alloy plates 30.

Each amorphous alloy plate 30 of the laminated body 31 is produced by processing a well-known thin amorphous alloy strip into a predetermined shape. The amorphous alloy plate 30 is very thin and has a thickness of about 10 to 100 μm. Furthermore, since the amorphous alloy plate 30 is amorphous, an electrical resistance of the amorphous alloy plate 30 is relatively high. Accordingly, the amorphous alloy plate 30 can reduce an eddy current loss in comparison to a magnetic steel plate, which is a typical component material for a laminated core. Additionally, since the contact resistance between each adjacent two amorphous alloy plates 30 serves as the electrical resistance against the eddy current, the eddy current loss can be reduced without placing an electrical insulator between the amorphous alloy plates 30. As a result, it is possible to increase the space factor of the amorphous alloy plates 30 in the core block 20.

In the present embodiment, a thin Fe-based amorphous alloy strip, which has a thickness of 25 μm, is processed into the amorphous alloy plate 30, which is annular when observed in a plan view, as shown in FIG. 3. The amorphous alloy plates 30 of the same thickness and the same shape are stacked one after another to form the laminated body 31. Alternatively, amorphous alloy plates 30 of different thicknesses may be stacked one after another to form the laminated body 31. Although not depicted in the drawings, each amorphous alloy plate 30 has grooves, which correspond to the slots 11.

The clamping plates 32 maintain the stable clamped state of the laminated body 31 and protect the end surfaces of the laminated body 31. Thus, as long as the clamping plates 32 has a required strength (a required rigidity), which is required to achieve the above functions of the clamping plates 32, any clamping plates can be used as the clamping plates 32. The material of the clamping plates 32 are not limited to any particular one as long as it can achieve the above required rigidity. However, a material, which can reduce the iron loss (mainly, the eddy current loss), is a preferred material of the clamping plates 32. Such a preferred material may include a magnetic steel material among various electrically conductive materials. The magnetic steel material is an iron based material doped with a few percent of silicon and is known to have a relatively low iron loss. Alternatively, a dielectric material, such as a resin material or a ceramic material, may be employed as the material of the clamping plates 32. In a case where the dielectric plates, which are made of, for example, the resin material, are used to form the clamping plates 32, no eddy current flows. Thus, the dielectric plates are advantageous in terms of the iron loss in comparison to the magnetic steel plates made of the magnetic steel material. However, the dielectric plates do not contribute to the generation of the magnetic field. Thus, in the case of the electromagnetic device (e.g., the motor 1), the use of the dielectric plates may be disadvantageous in terms of the performance of the electromagnetic device (e.g., a magnitude of generated torque in the case of the motor 1).

The shape and the thickness of the respective clamping plates 32 are not limited to any particular ones. However, it is preferred to select the number of the amorphous alloy plates 30 and the thickness of each clamping plate 32 in such a manner that a total volume of the laminated body 31 is larger than a total volume of the clamping plates 32 in the entire volume of the core block 20 (i.e., a sum of the total volume of the laminated body 31 and the total volume of the clamping plates 32). When the above condition is satisfied, a ratio (a space factor) of the total volume of the amorphous alloy plates 30 in the entire volume of the core block 20 is increased, so that the iron loss can be further reduced.

Figure 4:
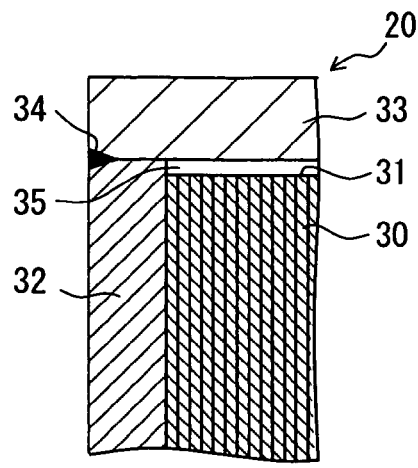
FIG. 4 is a partial cross sectional view taken along line IV-IV in FIG. 3.

In the present embodiment, the magnetic steel plates are used as the clamping plates 32. As shown in FIGS. 2 to 4, the thickness of each clamping plate 32 in the stacking direction S is set to be larger than that of the amorphous alloy plate 30 (in the alternative case of the amorphous alloy plates 30 of different thicknesses, this may be the thickest amorphous alloy plate 30). In this way, the required strength of the clamping plate 32 is implemented. More specifically, a magnetic steel plate, which has a thickness of 0.35 mm, is used as the clamping plate 32. Furthermore, the total volume of the laminated body 31 is made larger than the total volume of the clamping plates 32 in the entire volume of the core block 20.

Furthermore, as shown in FIGS. 3 and 4, each clamping plate 32 is formed as an annular plate, which is coaxial with the rotatable shaft 2 and the amorphous alloy plates 30. Furthermore, an inner diameter of this annular plate is generally equal to an inner diameter of each amorphous alloy plate 30, and an outer diameter of this annular plate is slightly larger than an outer diameter of each amorphous alloy plate 30. Although not depicted in the drawings, each clamping plate 32 has grooves, which correspond to the slots 11. The grooves of the clamping plates 32 and the grooves of the amorphous alloy plates 30 cooperate together to form the slots 11.

Any member can be employed as the holding member 33 as long as such a member can maintain the predetermined space between the clamping plates 32, which clamp the laminated body 31 therebetween, while such a member is in contact with each of the clamping plates 32 disposed on the opposed end surfaces, respectively, of the laminated body 31. It should be noted that the material, the shape and the number of the holding members 33 are not limited to any particular ones. Also, the way of fixing the holding members 33 is not limited to any particular one. However, a material, which can reduce the iron loss (mainly, the eddy current loss), is a preferred material of the holding members 33. Such a preferred material may include a magnetic steel material among various electrically conductive materials. Alternatively, a dielectric material, such as a resin material or a ceramic material, may be employed as the material of the holding members 33.

In the present embodiment, the holding members 33 are made of stainless steel. Furthermore, as shown in FIG. 4, the holding members 33 and the clamping plates 32 are welded together to stably hold the laminated body 31 between the clamping plates 32. More specifically, as shown in FIG. 4, an inner peripheral surface of each holding member 33 is brought into contact with an outer peripheral surface of each clamping plate 32, which has the outer diameter larger than that of each amorphous alloy plate 30 of the laminated body 31. Then, a contacting portion of the inner peripheral surface of each holding member 33 is welded with an opposed contacting portion of the outer peripheral surface of each clamping plate 32. Thereby, the holding members 33 and the clamping plates 32 are welded together. Furthermore, in the welded state, an end surface (a left end surface in FIG. 4) of the holding member 33 is generally flush with an end surface (a left end surface in FIG. 4) of the clamping plate 32, which is opposite from a contact surface (a right end surface in FIG. 4) of the clamping plate 32 that contacts with the laminated body 31. With the above construction, the laminated body 31 can be securely fixed by the clamping plates 32 and the holding members 33. Furthermore, it is possible to reduce the size of the stator core 10, in which the blocks 20 are stacked one after another in the stacking direction S. In addition, in order to stabilize the clamped state of the laminated body 31 with the clamping plates 32, the predetermined space is maintained between the clamping plates 32 through use of the four holding members 33, which are placed radially outward of the clamping plates 32 and are spaced from one another in the circumferential direction of the clamping plates 32, as shown in FIG. 3.

In the case where the holding members 33 are made of the electrically conductive material, the holding members 33 may serve as a passage of the eddy current, so that the eddy current loss may possibly occur. In contrast, according to the present embodiment, the outer diameter of each clamping plate 32 is set to be larger than the outer diameter of each amorphous alloy plate 30. In this way, a predetermined gap 35 (an air gap in the present embodiment) is formed between each holding member 33, which contacts the outer peripheral surface of each clamping plate 32, and the laminated body 31 (each amorphous alloy plate 30). Therefore, it is possible to limit the flow of the eddy current between each adjacent amorphous alloy plates 30 through the holding members 33. Thereby, it is possible to advantageously use the property of the amorphous alloy plates 30 (i.e., a low eddy current loss property).

Furthermore, according to the present embodiment, as shown in FIG. 3, in a plane perpendicular to the stacking direction S, a cross sectional area of each contact portion 33a of each holding member 33, which is welded to the corresponding clamping plate 32, is set to be larger than a cross sectional area of an intermediate portion 33b located between the contact portions 33a of the holding member 33. In other words, each contact portion 33a of each holding member 33 has a circumferential extent, which is measured in a circumferential direction of the laminated body 31 and is larger than that of the intermediate portion 33b of the holding member 33. With this configuration of the holding member 33, a sufficient joint strength of the holding member 33 relative to the clamping plates 32 can be achieved by the contact portions 33a of the holding member 33, which has the larger cross sectional area. Furthermore, the intermediate portion 33b of the holding member 33, which has the smaller cross sectional area, can advantageously limit the flow of the eddy current. Accordingly, the eddy current loss of the holding member 33 can be reduced. Furthermore, as in the case of the present embodiment where the clamping plates 32 and the holding members 33 are made of the electrically conductive material, it is possible to limit the flow of the eddy current between the clamping plates 32 through the holding members 33. Accordingly, this arrangement also serves to reduce the eddy current loss.

Figure 5:
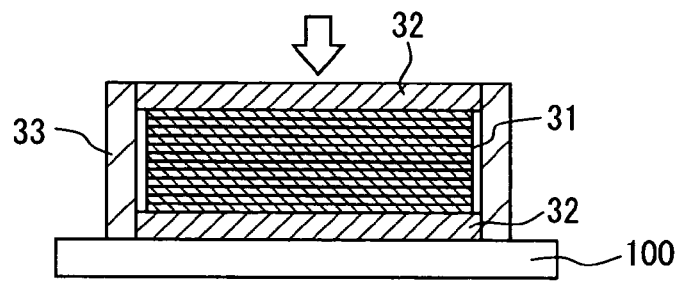
FIG. 5 is a schematic cross sectional view for describing a manufacturing method of the core block.

For example, the core block 20 configured in the above described manner may be formed as described below. FIG. 5 is a schematic cross sectional view for describing a manufacturing method of the core block. First, the amorphous alloy plates 30, each of which is processed into the predetermined shape, and the clamping plates 32, each of which is processed into the predetermined shape, are prepared. Then, as shown in FIG. 5, the clamping plate 32, the laminated body 31, and the other clamping plate 32 are positioned and stacked in this order on a base 100. After that, as indicated by a hollow arrow in FIG. 5, a pressure is applied to the upper clamping plate 32 toward the base 100, so that the clamping plates 32 and the laminated body 31 are compressively pushed against the base 100. Then, under the application of the downward pressure, the holding members 33 are brought into contact with the outer peripheral surface of the clamping plates 32, and the clamping plates 32 and the holding members 33 are welded together. Thereby, the core block 20 is formed. Then, the core blocks 20 thus formed are placed in a housing, so that the core blocks 30 are stacked one after another to form the stator core 10.

As described above, the laminated core (the stator core 10) of the electromagnetic device according to the present embodiment includes the laminated body 31, which consists mainly of the amorphous alloy plates 30 that are stacked one after another. It is thus possible to reduce the iron loss (especially, the eddy current loss). In this embodiment, the total volume of the laminated body 31 is larger than the total volume of the clamping plates 32 in the entire volume of the core block 20. Accordingly, the amorphous alloy plates 30 have the high volumetric proportion, so that it is possible to achieve a further reduction in the iron loss.

Furthermore, the clamping plates 32, which fix the amorphous alloy plates 30 relative to each other, are only disposed on the opposed end surfaces, respectively, of the laminated body 31, which are opposed to each other in the stacking direction S. That is, no adhesive resin layer is present between any adjacent two amorphous alloy plates 30, so that the iron loss can be reduced without degrading the space factor. Also in this particular embodiment, since each clamping plate 32 is made of the magnetic steel plate, the iron loss can be further reduced.

Furthermore, in each holding member 33 made of the electrically conductive material, the cross sectional area of each contact portion 33a, which contacts the clamping plate 32, is made larger than the cross sectional area of the intermediate portion 33b located between the contact portions 33a. It is thus possible to reduce the iron loss while implementing the sufficient contact strength of the holding member 33 to the clamping plates 32. Also in this embodiment, since the holding members 33 are spaced from the laminated body 31, it is possible to further reduce the iron loss.

Furthermore, the thin amorphous alloy plates 30 are clamped together in the stacking direction S thereof between the clamping plates 32, each of which has the thickness larger than that of each amorphous alloy plate 30. Also, the holding members 33 are welded to the clamping plates 32, and the predetermined distance between the clamping plates 32 is set by the length of the holding members 33 in a manner that maintains the clamped state of the laminated body 31. Therefore, the amorphous alloy plates 30 are securely fixed while maintaining the contact state between each adjacent two amorphous alloy plates 30, so that the laminated core of the present embodiment can be advantageously used in, for example, the motor where the relatively strong mechanical torque is applied to the laminated core.

Furthermore, the clamping plates 32 and the holding members 33 are securely welded together to clamp the laminated body 31, so that it is possible to limit a damage to the amorphous alloy plates 30 at the time of welding (time of fixing the laminated body 31). Furthermore, the clamping structure of the laminated core allows relatively easy separation of the amorphous alloy plates 30 from the clamping plates 32 and the holding members 33 at the time of disassembly for recycling. Accordingly, the clamping structure of the stator core 10 implements the improved recyclability in comparison to the laminated core, in which the amorphous alloy plates are stacked one after another while placing the adhesive layer between each adjacent two amorphous alloy plates. In this embodiment, the amorphous alloy plates 30, the clamping plates 32 and the holding members 33 are all made of the same metal-based material (i.e., iron). Thereby, it is possible to implement the further improved recyclability.

In the present embodiment, the laminated body 31, in which the amorphous alloy plates 30 are stacked one after another, are clamped by the clamping plates 32, each of which is made of the magnetic steel plate. Thereby, it may possibly increase the iron loss in comparison to the laminated core, which is made only of the amorphous alloy plates 30. In view of the above point, the inventors of the present application made a comparison test using a test laminated core, which is analogous to the stator core 10 of the present embodiment. In the manufacturing of the test laminated core, five hundred amorphous alloy plates 30 are stacked one after another (METGLAS 2605TCA produced by Nippon Amorphous Metals Co. Ltd., each amorphous alloy plate having a thickness of 25 μm). Each amorphous alloy plate 30 of this test laminate core is formed as an annular plate, which has an outer diameter of 90 mm and an inner diameter of 50 mm. Then, the stacked amorphous alloy plates 30 are clamped between two clamping plates 32 (JN270 produced by JFE Steel Corp., each clamping plate having a thickness of 0.35 mm). Each clamping plate 32 is formed as the magnetic steel plate, which has generally the same annular shape as that of the amorphous alloy plate 30. Then, six stainless steel holding members 33 are fixed to the outer peripheral surfaces of the clamping plates 32. This test laminated core is compared with a comparative laminated core, which includes only five hundred amorphous alloy plates stacked one after another. The result of this comparison test indicates that the iron loss of the test laminated core and the iron loss of the comparative laminated core show no substantial difference therebetween. This shows that the laminated core (stator core 10) of the present embodiment is capable of reducing the iron loss while providing the strong fixing structure.

Figure 6:
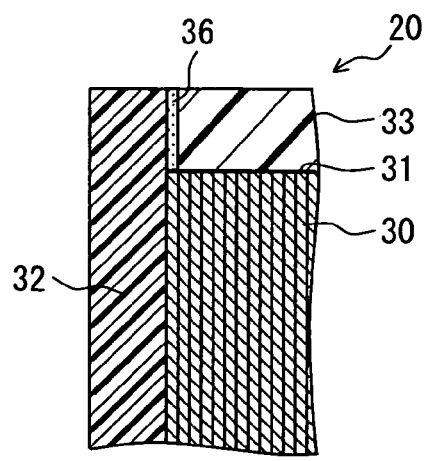
FIG. 6 is a partial cross sectional view showing a modification of the core block.

Furthermore, in the present embodiment, the clamping plates 32 and the holding members 33 are fixed together by the welding. Here, it should be noted that the way of fixing the clamping plates 32 and the holding members 33 together is not limited to the welding. Furthermore, the material of the clamping plates 32 is not limited to the magnetic steel plate, and any other suitable electrically conductive material or dielectric material may be used to form the clamping plates 32. Furthermore, the material of the holding members 33 is not limited to the stainless steel, and any other suitable electrically conductive material or dielectric material may be used to form the clamping plates 32. For example, in an exemplary structure shown in FIG. 6, the clamping plates 32 and the holding members 33 are all made of resin and fixed together with adhesive (bonding agent) 36. As in this modification of the present embodiment, when the dielectric material is used, no eddy-current flows, so that it is possible to further reduce the iron loss. Furthermore, in such a case where the holding members 33 are made of the dielectric material, no gap is required between the laminated body 31 and each holding member 33, as shown in FIG. 6. Therefore, the size of the respective core blocks 20 and the size of the laminated core (stator core 10) can be reduced. Furthermore, in the case where the holding members 33 are made of the dielectric material, no eddy current flows. Thus, the structure (shape) of each holding member 33 can be simplified.

Figure 7:
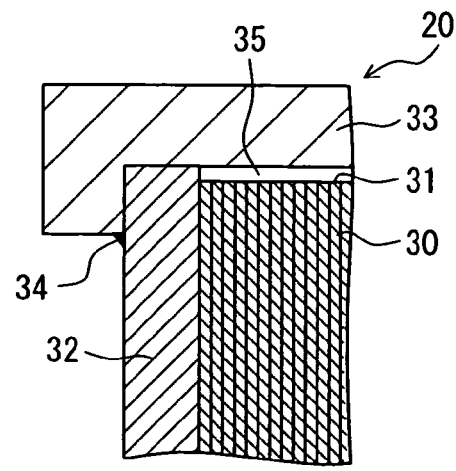
FIG. 7 is a partial cross sectional view showing another modification of the core block.

In the above embodiment, the end surface (the left end surface in FIG. 4) of the holding member 33 is generally flush with the end surface (the left end surface in FIG. 4) of the clamping plate 32, which is opposite from the contact surface (the right end surface in FIG. 4) of the clamping plate 32 that contacts with the laminated body 31. However, for example, as in another modification of the present embodiment shown in FIG. 7, the end surface of the holding member 33 may be not flush with the end surface of the clamping plate 32, which is opposite from the contact surface of the clamping plate 32 that contacts with the laminated body 31. In FIG. 7, each holding member 33 is formed into a horseshoe shape. With this configuration of the holding member 33, it is possible to stably hold the laminated body 31 and the clamping plates 32, which are stacked together. However, in such a case, the size of the core block 20 in the stacking direction S is increased in comparison to the above embodiment.

Furthermore, in the above embodiment, the outer peripheral surface of the one clamping plate 32 and the outer peripheral surface of the other clamping plate 32 are fixed together by the holding members 33. Alternatively, the inner peripheral surface of the one clamping plate 32 and the inner peripheral surface of the other clamping plate 32 may be fixed together by the holding members 33. However, in the case of the stator core 10, the rotor 3 is located radially inward of the stator core 10. Thus, in such a case, it is desirable to fix the outer peripheral surface of the one clamping plate 32 to the outer peripheral surface of the other clamping plate 32 with the holding members 33.

Second Embodiment

Figure 8:
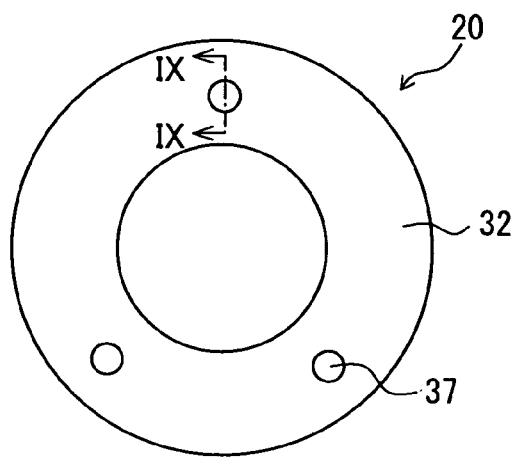
FIG. 8 is a plan view of a core block of a stator core according to a second embodiment of the present invention.
Figure 9:
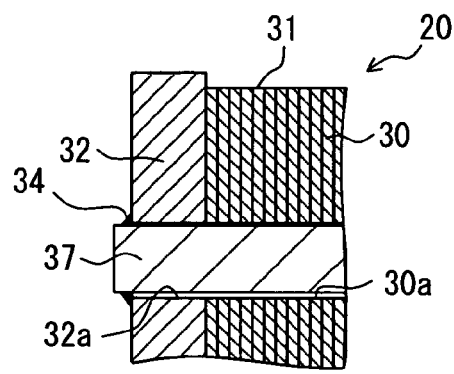
FIG. 9 is a partial cross sectional view taken along line IX-IX in FIG. 8.

Next, a second embodiment of the present invention will be described with reference to FIGS. 8 and 9. FIG. 8 is a plan view of a core block of a stator core of the second embodiment. FIG. 9 is a partial cross sectional view along line IX-IX in FIG. 8. In FIG. 8, the slots 11 are not depicted for the sake of simplicity.

The most structure of the stator core (laminated core) of the second embodiment is the same as that of the stator core (laminated core) of the first embodiment. Therefore, in the following description, such a common structure will not be described for the sake of simplicity, and the different structure of the second embodiment, which is different from that of the first embodiment, will be mainly described. Furthermore, components similar to those of the first embodiment will be indicated by the same reference numerals in the second embodiment.

In the present embodiment, as shown in FIGS. 8 and 9, through holes 30a, 32a extend through the respective amorphous alloy plates 30 and the respective clamping plates 32 of the laminated body 31 in the stacking direction S. The holding members 37 are held in the through holes 30a, 32a such that the holding members 37 are received through the through holes 30a, 32a. More specifically, as shown in FIG. 9, the through holes 30a, 32a, each of which has a circular cross section of the same diameter, are provided in the respective amorphous alloy plates 30 and the respective magnetic steel clamping plates 32. These through holes 30a, 32a respectively receive the holding members 37, each of which is formed into a cylindrical body that has a diameter smaller than the diameter of each through hole 30a, 32a. An end portion of each holding member 37 protrudes from the end surface of the clamping plate 32, which is opposite from the contact surface of the clamping plate 32 that contacts with the laminated body 31, and this end portion of the holding member 37 is fixed to the clamping plate 32 by welding. In the present embodiment, the number of through holes 30a, 32a, which extend through the respective amorphous alloy plates 30 and the respective clamping plates 32, is three, and the number of the holding members 33, which are received in the through holes 30a, 32a, is also three.

In such a configuration, for example, the laminated body 31 and the clamping plates 32 are stacked such that the through holes 30a, 32a are received over the holding members 33. Then, the clamping plates 32 and the laminated body 31 are pressed together from the opposed sides of the laminated body 31 without contacting the holding members 33. Thereafter, the welding is performed in this pressed state.

The laminated core (stator core 10) of the electromagnetic device according to the present embodiment can provide the advantages similar to those of the first embodiment. Furthermore, a positional deviation of the amorphous alloy plates 30 in a direction perpendicular to the stacking direction S can be limited by the holding members 33. Thus, it is possible to limit the variations in the space between the stator 4 and the rotor 3. Furthermore, it is possible to improve the productivity of the laminated core, in which the positional deviation of the amorphous alloy plates 30 in the direction perpendicular to the stacking direction S is limited. Particularly, in the present embodiment, the multiple holding members 37 are provided, so that the positional deviation of the amorphous alloy plats 30 can be more effectively limited.

Here, in order to implement the positioning function of the holding members 37, it is desirable that the diameter of each holding member 33 is slightly smaller than the diameter of the corresponding through hole 30a, 32a. Thus, it is conceivable that in the received state of the holding members 37 in the through holes 30a, 32a, at least a portion of each holding member 37 contacts the amorphous alloy plates 30, as shown in FIG. 9. Therefore, in the case where the holding members 37 and the through holes 30a, 32a have the above positional relationship, when the holding members 33, which are made of the electrically conductive material, are received in the through holes 30a, 32a, the eddy current may possibly flow in the respective amorphous alloy plates 30 through the holding members 33. Furthermore, since the holding members 33 are received in the through holes 30a, 32a, it is difficult to form the holding members 32 into a shape that can limit the eddy current loss like in the first embodiment. Thus, it is conceivable that the effect of reducing the iron loss (particularly, the eddy current loss) is reduced in comparison to the structure of the first embodiment.

Figure 10:
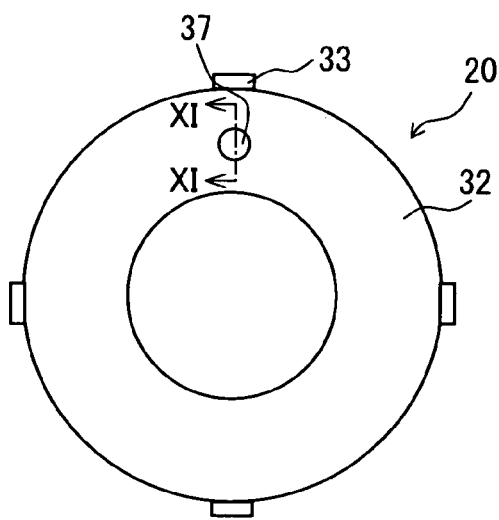
FIG. 10 is a plan view showing a modification of the core block.
Figure 11:
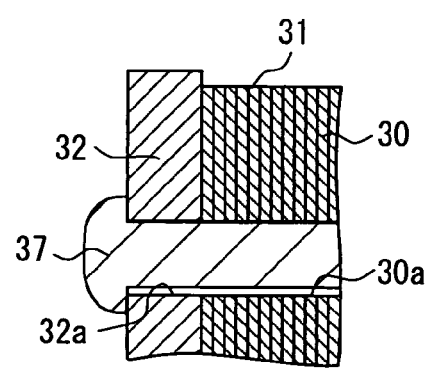
FIG. 11 is a partial cross sectional view taken along line XI-XI in FIG. 10.

In view of this, it is desirable to have a structure of a modification shown in FIGS. 10 and 11 in order to limit the variations in the space between the stator 4 and the rotor 3 while maintaining the iron loss reducing effect. In the structure shown in FIGS. 10 and 11, similar to the first embodiment, four holding members 33 are placed radially outward of the amorphous alloy plates 30 and the clamping plates 32 to maintain the predetermined space between the clamping plates 32, and one holding member 37 is received in the through hole 30a, 32a. When the single holding member 37 is placed to contact the amorphous alloy plates 30, it is possible to limit the eddy current flow between each adjacent two amorphous alloy plates 30 through the holding members 37. Here, it should be noted that only the single holding member 37 may be provided without providing any other holding member, if desired. However, as shown in FIGS. 10 and 11, in order to implement the stronger fixing structure, at least one holding member 37 and at least one holding member 33 (four holding members 33 in the case of FIG. 10) should be provided to maintain the predetermined space between the clamping plates 32. As shown in FIG. 11, each end portion of the holding member 37, which protrudes from the corresponding clamping plate 32, is clinched to integrate the clamping plates 32 and the holding member 37 together. That is, the holding member 37 is like a rivet. As described here, the other fixing method, which is other than the welding, may be used. Alternatively, thermal staking, snap fitting or any other fixing method may be appropriately used based on the material.

In the present embodiment, each holding member 37 is made of the stainless steel. Alternatively, each holding member 37 may be made of any other electrically conductive material or dielectric material. In the case of forming each holding member 37 from the dielectric material, no eddy current flows. Therefore, even when multiple holding members 37 are provided, it is possible to limit the increase of the iron loss.

The preferred embodiments of the present invention have been described. However, the present invention is not limited to the above embodiments. The above embodiments may be modified in various ways without departing the spirit and scope of the present invention.

In the above embodiments, the motor 1 is used as the electromagnetic device, and the characteristic structure of the present invention is adapted in the stator core 10 of the stator 4. However, application of the present invention is not limited to the stator core 10, and the present invention may be applied to a core of the rotor 3. Also, application of the present invention is not limited to the motor 1. For example, besides the motor 1, the present invention may be applied to a transformer.

In the above embodiments, the stator core 10 (laminated core) includes the multiple core blocks 20. Alternatively, the stator core (laminated core) may include a single core block 20. The number of the core blocks 20 may be appropriately selected depending on, for example, the size of the stator core 10, the strength of the stator core 10 and a degree of easiness of handing of the amorphous alloy plates 30.

In the present embodiment, the amorphous alloy plates 30 and the clamping plates 32 are formed into the annular plate shapes. However, the shapes of the amorphous alloy plates 30 and of the clamping plates 32 are not limited to the annular plate shapes. For example, the amorphous alloy plates 30 and the clamping plates 32 may be formed into rectangular plate shapes, each having a center hole therein or may be formed into any other polygonal plate shapes, each having a center hole therein. Further alternatively, the slots 11 may be eliminated, and the fixing structure of the windings 12 is not limited to the above one.

Additional advantages and modifications will readily occur to those skilled in the art. The invention in its broader terms is therefore not limited to the specific details, representative apparatus, and illustrative examples shown and described.

What is claimed is:

1. A laminated core for an electromagnetic device, comprising a plurality of generally identical blocks, wherein each block includes:

a laminated body that includes a plurality of amorphous alloy plates, which are stacked one after another in a stacking direction such that each adjacent two of the plurality of amorphous alloy plates directly contact with each other;

first and second clamping plates that contact opposed first and second end surfaces, respectively, of the laminated body in the stacking direction, wherein a thickness of each of the first and second clamping plates in the stacking direction is larger than that of each of the plurality of amorphous alloy plates; and at least one holding member, which contacts with the first and second clamping plates and maintains a predetermined space between the first and second clamping plates while the laminated body is clamped between the first and second clamping plates, wherein:

each holding member is spaced from the laminated body; and the laminated body, the first and second clamping plates and the at least one holding member are integrated together in each block.

2. The laminated core according to claim 1, wherein a total volume of the laminated body is larger than a total volume of the first and second clamping plates.

3. The laminated core according to claim 1, wherein each of the first and second clamping plates is made of an electrically conductive material.

4. The laminated core according to claim 3, wherein each of the first and second clamping plates is an electromagnetic steel plate.

5. The laminated core according to claim 1, wherein each of the first and second clamping plates is made of a dielectric material.

6. The laminated core according to claim 1, wherein each holding member is made of an electrically conductive material.

7. The laminated core according to claim 6, wherein each of the first and second clamping plates is an electromagnetic steel plate.

8. The laminated core according to claim 6, wherein each of the first and second contact portions of each holding member, which contact the first and second clamping plates, respectively, has a cross sectional area, which is measured in a plane perpendicular to the stacking direction and is larger than that of an intermediate portion of the holding member located between the first and second contact portions of the holding member.

9. The laminated core according to claim 6, wherein one of the at least one holding members contacts the laminated body.

10. The laminated core according to claim 1, wherein each holding member is made of a dielectric material.

11. The laminated core according to claim 1, wherein:

at least one through hole extends through each of the plurality of amorphous plates and each of the first and second clamping plates in the stacking direction; and the at least one holding member is received through the at least one through hole and holds the first and second clamping plates.

* * * * *